March 19, 1963  W. D. HORSLEY  3,082,337
DYNAMO-ELECTRIC MACHINES

Filed Sept. 21, 1956  2 Sheets-Sheet 1

March 19, 1963   W. D. HORSLEY   3,082,337
DYNAMO-ELECTRIC MACHINES
Filed Sept. 21, 1956   2 Sheets-Sheet 2

United States Patent Office 3,082,337
Patented Mar. 19, 1963

3,082,337
DYNAMO-ELECTRIC MACHINES
William D. Horsley, Newcastle-upon-Tyne, England, assignor to C. A. Parsons & Company Limited, Newcastle-upon-Tyne, England
Filed Sept. 21, 1956, Ser. No. 611,228
Claims priority, application Great Britain Sept. 26, 1955
7 Claims. (Cl. 310—179)

This invention relates to dynamo-electric machines and particularly to turbo-type generators of large output.

The output of turbo generators is increasing rapidly and single units running at 3,000 and 3,600 r.p.m. having an output of 200,000 kw. have been installed or are in course of manufacture. Larger units are contemplated. This increase in output has been obtained mainly by the use of hydrogen at relatively high pressure for cooling the generator and by the development of direct cooling of the copper in the stator and rotor windings. Thus the physical dimensions of generators have not been greatly increased. As a result, the electrical loading defined by the product of the stator current and the number of active conductors has become much greater. Therefore, in order to adhere to the same electrical characteristics, particularly in regard to short circuit ratio, that is the ratio of the field current for rated open-circuited armature voltage and rated frequency to field current for rated armature current on sustained symmetrical short circuit at rated frequency, as have been used in the past, the air gap has to be made much larger.

A generator designed for a short circuit ratio of 0.5 to 0.55 may have an air gap of approximately four inches while with a short circuit ratio of 0.7 to 0.8 the air gap may approach six inches. Such air gaps take up a considerable amount of space in the machines.

The object of the present invention is to provide for the utilisation of some of the space available in the air gap.

The invention consists in a dynamo-electric machine in which machine electrical conductors constituting or forming part of the stator winding are accommodated wholly or partially in the air gap.

The invention also comprises a dynamo-electric machine in accordance with the preceding paragraph in which the stator conductors in the air gap are embedded in a detachable cylinder.

The invention also comprises a dynamo-electric machine in accordance with the preceding paragraph in which the cylinder slidably engages the inner surface of the stator core and projections on the cylinder slidably engage recesses in the said core to prevent rotation of the cylinder.

The invention also consists in a dynamo-electric machine as claimed in claims below.

Referring to the accompanying diagrammatic drawings.

Figure 1:
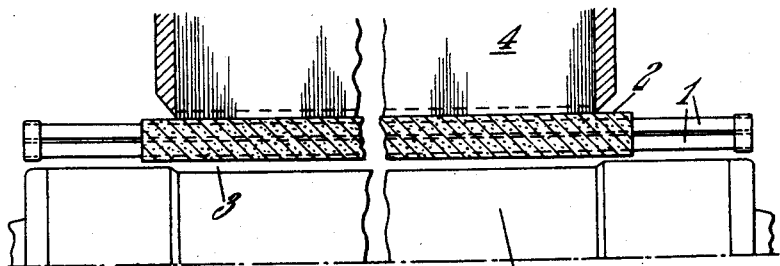
FIGURE 1 shows a view partly in section through an alternator showing conductors located in the air gap.

In carrying the invention into effect in one form by way of example as applied in a turbo-alternator and referring to FIGURE 1 the individual conductors 1 of the stator windings are located in a detachable cylinder 2 situated in the air gap 3 of the machine between the stator core 4 and the rotor 5. Whilst in FIGURE 1 the cylinder 2 does not extend for the full length of the conductors it can do so if desired. The conductors may be of circular or of rectangular or square section or of other suitable shapes and are subdivided into insulated strips and suitably twisted or transposed in accordance with normal practice to minimise eddy currents. The conductors are preferably made hollow or are provided with suitable ducts to carry cooling gas or liquids flowing in direct contact or substantially direct contact with the copper, also in accordance with known constructions or proposals.

Figures 2A, 2B, 2C:
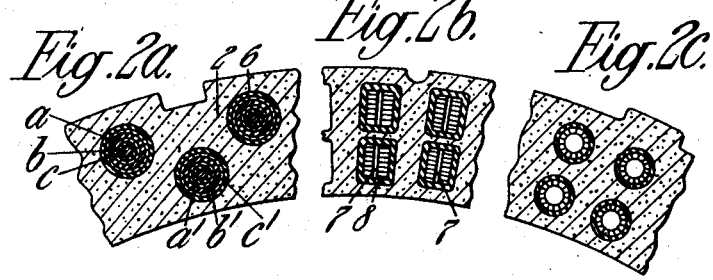
FIGURES 2a, 2b and 2c show the application of the invention to various forms of conductor.

Of the forms illustrated, FIGURE 2a shows high voltage conductors 6 embedded in a detachable cylinder 2. The conductors shown consist of a series of central strands $a$ and two concentric rings of strands $b$ and $c$ all separated from each other by intermediate layers of insulation $a'$, $b'$ and $c'$. FIGURE 2b shows conductors suitable for direct cooling, the conductor strands being arranged on either side of a cooling duct 7 and being surrounded by insulation 8.

FIGURE 2c shows a circular conductor suitable for direct cooling.

Suitable compartments or ducts or pipes or combinations of these or some of them are provided to convey the cooling gas or liquid to and from the conductors.

Figure 3A:
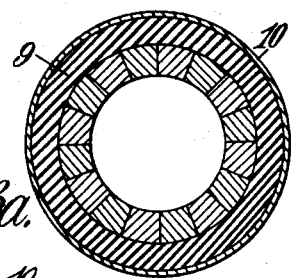
FIGURES 3a and 3b show the construction of a typical insulated conductor suitable for use with the invention.
Figure 3B:
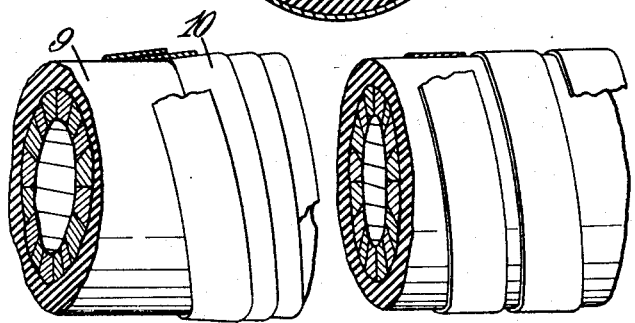

The conductors are insulated as shown in FIGURES 3a and 3b with insulation 9 which may be in the form of micanite tubes, which are taped or wrapped on to the conductor or a silicone compound, paper or any other suitable material suitably applied to the required thickness to withstand the operating or higher voltage. The outside of the insulating tube 9 is preferably covered with a conducting metallic sheath 10 or coating and the sheaths of the respective conductors are connected to one another and to earth at suitable points in order to ensure that the voltage gradients in the insulating tubes are substantially uniform. Alternatively, the conducting sheaths around the conductor may be insulated from earth, in which case they may then be connected electrically to the neutral point of the winding so that under all conditions of operation the maximum potential between a conductor and its surrounding sheath does not exceed phase voltage. The thickness of the main insulating tube may, therefore, be less than normal. The conducting sheath layer may be in the form of a high resistance metal or graphite coating of suitable electrical conductivity in order to prevent excessive eddy currents. According to a modification the sheath may be formed of metal tape or wire suitably dimensioned and disposed to minimise eddy currents.

Figure 4:
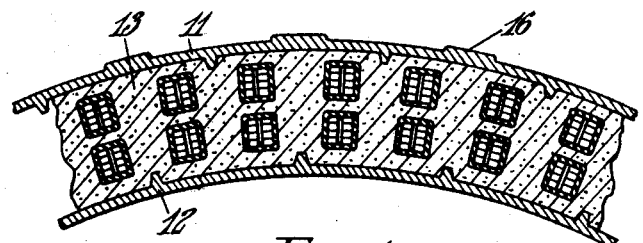
FIGURE 4 shows one form of construction of the detachable cylinder in which the conductors are embedded.

The windings are preferably of the diamond coil type arranged in barrel form, although other types of windings may be used. The windings, including the end windings, can be assembled between two cylinders 11, 12 of suitable material (for instance bakelised paper, fuller board, or micanite) as shown in FIGURE 4. The space between conductors is filled in with a suitable casting resin 13, for example, an epoxy-resin, or with other material. In an alternative method the conductors are set in a mould and a casting resin or a form of concrete poured in to make, after withdrawal from the mould, a solid self supporting cylinder, in which the conductors are embedded. With either form of construction the windings are firmly supported against electromagnetic forces under short circuit conditions.

Figure 5:
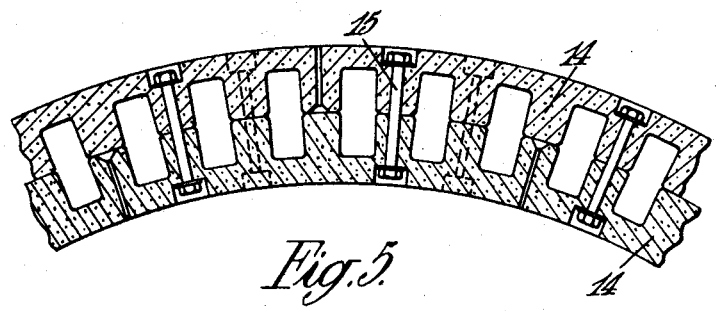
FIGURES 5 and 6 show two other forms of detachable cylinder in accordance with the invention.

In yet a further form, shown in FIGURE 5, the cylinder is constructed in the form of segments 14 which can be bolted together by means of insulated bolts 15. This construction facilitates the removal of conductors for repair.

In either case the cylinder may be provided with suitable keys or projections 16 (FIGURE 4) which fit into and slide in corresponding recesses in the stator core to prevent the cylinder rotating when in service either during normal operating or under fault conditions. Alternatively, the cylinder may be arranged to slide into a smooth bore and suitable locating means to prevent rotation during operation, provided at one or both ends.

Embedding the conductors in a detachable cylinder in the way described instead of, as in the known practice, having them in slots in the inner periphery of the stator core has the advantage that the conductor assembly can be built separately and fitted in the stator core after completion. The whole conductor assembly forming the stator winding is thus replaceable and capable of being transported separately.

Further, the elimination of stator teeth means a reduction in the overall diameter of the stator core with consequent reduction of iron losses and improvement in the efficiency of the alternator.

By arranging the conductors in the air gap the available space for the accommodation of the conductors in a circumferential direction is increased due to the elimination of the stator teeth, and this permits greater freedom in the proportioning of the stator conductors and increases the area of copper which can be provided. The copper losses may then be reduced compared with known constructions and the efficiency of the alternator increased.

By embedding the stator conductors in a cylinder of the form described the conductors are firmly supported at all points.

Figure 6:
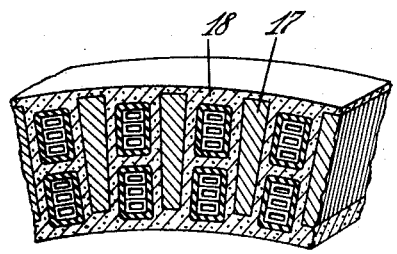

In a further form of construction according to the invention shown in FIGURE 6 packs of laminations in the form of detached stator teeth 17 are accommodated between the conductors and held in position by the material 18 used for moulding the cylinder. This construction is of advantage where the length of the air gap necessary for the accommodation of the stator winding is greater than that required for the design characteristics. If grain orientated cold rolled core plate is used the direction of the grain can be arranged in the correct sense both for the core and the teeth.

Whilst in the forms of the invention described so far the conductors have been individually insulated the bare conductors may be embedded in a cylinder in the way described except that in this case the material of the cylinder must be an electrical insulating material. With such a construction the cylinder may be bounded on its inner periphery or its outer periphery or both by a semi-conducting layer which could be connected to earth or to the neutral part of the windings.

The invention may be used with any suitable type of cooling system.

The term "air gap" is used throughout the specification to mean a gap in the magnetic circuit of the machine irrespective of the fact that in most cases in the type of machine described the air gap does not contain air but a cooling fluid such as hydrogen.

Whilst in the forms illustrated substantially uniform pitching of the conductors is shown, it will be appreciated that conductors or groups of conductors may be spaced in an irregular fashion around the periphery if so desired.

It will also be appreciated that the whole of the stator conductors may be embedded in the cylinder or only a proportion. Some conductors, for instance, may be arranged partially in the cylinder and partially in the stator core if desired.

When direct-gas cooled windings are used suitable openings may be provided in the ends of the cylinder to form gas inlets and outlets.

With liquid cooled windings suitable headers may be cast integrally with the cylinder to conduct the coolant in and out of the hollow conductors.

I claim:

1. A dynamo-electric machine comprising a rotor and a stator having magnetic cores defining the magnetic circuit and an air gap between the same, and electrical conductors constituting part of the stator winding and positioned in the air gap, and a detachable cylinder of electrically insulating material located in the air gap and in which the said conductors are embedded.

2. A dynamo-electric machine as claimed in claim 1, in which the cylinder slidably engages the inner surface of the stator core and comprising means for fixing the cylinder to the stator core to hold the cylinder against rotation.

3. A dynamo-electric machine in accordance with claim 1, in which the conductors are located between two cylinders of insulating material and comprising cast resin filling the space between said cylinders and around said conductors.

4. A dynamo-electric machine in accordance with claim 1, in which the cylinder is made in the form of segments which are subsequently bolted together.

5. A dynamo-electric machine as claimed in claim 1, in which the cylinder or cylinders accommodate, in the spaces between the conductors, a pack of laminated core plate.

6. A dynamo-electric machine as claimed in claim 1, in which the said conductors are bare.

7. A dynamo-electric machine as claimed in claim 2 in which the means preventing rotation of the cylinder comprises projections slidably engaging recesses in the stator core.

References Cited in the file of this patent

UNITED STATES PATENTS

| | | |
|---|---|---|
| 325,619 | Mueller | Sept. 1, 1885 |
| 1,480,312 | Stratton | Jan. 8, 1924 |
| 1,602,947 | Schroeder | Oct. 12, 1926 |
| 1,813,394 | Fraser | July 7, 1931 |
| 1,978,100 | Buerke | Oct. 23, 1934 |
| 2,416,341 | Morrison | Feb. 25, 1947 |
| 2,470,767 | Ellis | May 24, 1949 |
| 2,759,116 | Glass | Aug. 14, 1956 |

FOREIGN PATENTS

| | | |
|---|---|---|
| 802 | Great Britain | of 1913 |
| 3,432 | Great Britain | of 1905 |
| 3,481 | Great Britain | of 1896 |
| 4,940 | Great Britain | of 1888 |
| 158,013 | Great Britain | Feb. 3, 1921 |
| 859,496 | Germany | Dec. 15, 1952 |